United States Patent
Fossion et al.

(10) Patent No.: US 7,567,613 B2
(45) Date of Patent: Jul. 28, 2009

(54) TEST METHOD AND APPARATUS FOR IN-HOUSE WIRING PROBLEMS

(75) Inventors: Marc Jean Joseph Fossion, Ligny (BE); Jérôme Alexandre Eekman, Manage (BE)

(73) Assignee: Alcatel, Paris (FR)

( * ) Notice: Subject to any disclaimer, the term of this patent is extended or adjusted under 35 U.S.C. 154(b) by 495 days.

(21) Appl. No.: 11/313,922

(22) Filed: Dec. 22, 2005

(65) Prior Publication Data

US 2006/0164101 A1    Jul. 27, 2006

(30) Foreign Application Priority Data

Dec. 24, 2004    (EP)    .................................. 04293136

(51) Int. Cl.
*H04B 3/46* (2006.01)
*H04B 17/00* (2006.01)
*H04Q 1/20* (2006.01)

(52) U.S. Cl. ........................ 375/227; 375/222; 375/228; 375/257; 375/260

(58) Field of Classification Search .................. 375/222, 375/224, 227, 228, 257, 259, 260
See application file for complete search history.

(56) References Cited

U.S. PATENT DOCUMENTS

| 6,574,308 B1 * | 6/2003 | Macdonald et al. ........ 379/1.04 |
| 2002/0009970 A1 | 1/2002 | Asia et al. |
| 2004/0131111 A1 | 7/2004 | Palm |
| 2004/0202237 A1 | 10/2004 | Krinsky et al. |
| 2006/0159162 A1 * | 7/2006 | Shrikhande et al. ......... 375/222 |

FOREIGN PATENT DOCUMENTS

WO    WO 2004/047481 A2    6/2004

* cited by examiner

*Primary Examiner*—David B Lugo
(74) *Attorney, Agent, or Firm*—Harness, Dickey & Pierce, P.L.C.

(57) ABSTRACT

To test for in-house wiring problems, upstream transmission profiles are tuned automatically and remotely, and reactive downstream parameter modifications indicative for in-house wiring problems are measured.

21 Claims, 1 Drawing Sheet

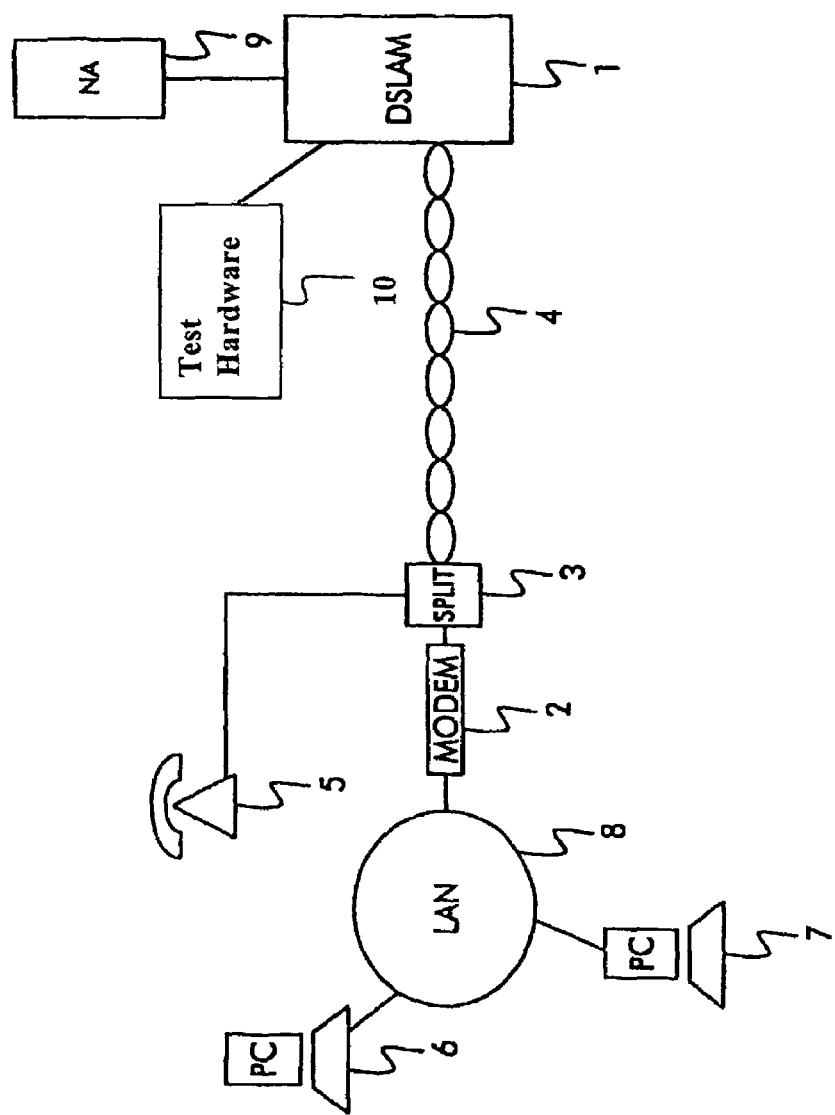

TEST METHOD AND APPARATUS FOR IN-HOUSE WIRING PROBLEMS

BACKGROUND OF THE INVENTION

The present invention relates to a test method and equipment to detect in-house wiring problems, for instance in an xDSL network.

The acronym xDSL stands for the family of Digital Subscriber Line technologies, which allow high-speed access to the Internet and multimedia services such as video, gaming, etc. over the local loop, which connects the CP (customer premises) to the CO (central office), typically over simple twisted pair cables. An xDSL transceiver at the CO, which is a subscriber line concentrator like a DSLAM (digital subscriber line access multiplexer) or DLC (digital loop carrier), communicates with an xDSL transceiver at the CP, which is a subscriber modem like a DSL modem or router, over the local loop. Behind the subscriber modem, in-house cabling is installed usually by the end users themselves. This in-house cabling is often not compliant with recommended installation rules. The consequence of such bad in-house wiring installation practice, is often poor performance and reliability of the xDSL link between the CO and CP: low bit rate, high bit error rate (BER), loss of data packets, loss of connection and service disruption. Such poor performing xDSL connections are not suitable for high bandwidth, real-time services like video distribution or interactive TV over xDSL, resulting in reduced revenue potential for the telecom operators.

Since decades the local loop, which is a transmission line consisting of two twisted copper wires, also called unshielded twisted pair (UTP), has given the customer access to POTS (Plain Old Telephony Service). The POTS signal, transmitted over the local loop, is analogue and contained in the frequency band up to 4 kHz, which corresponds to the spectral content of speech. xDSL exploits the frequency band above 4 kHz up to several MHz, which is not used by POTS. The frequency band above 4 kHz contains a downstream channel for transmission from the CO to the CP, and an upstream channel for transmission from the CP to the CO. The nature (e.g. asymmetric or symmetric, time domain duplexing or frequency domain duplexing, single carrier or multi-carrier, etc.) and size (achievable bit rate or capacity) of the downstream channel and upstream channel depend on the xDSL flavour: for instance ADSL (Asymmetric Digital Subscriber Line), SDSL (Symmetric Digital Subscriber Line), HDSL (High Speed Digital Subscriber Line), VDSL (Very High Speed Digital Subscriber Line), . . .

To separate the POTS and ADSL services using the same twisted pair, installation rules for instance specify that each telephone set (i.e. POTS or ISDN terminal) must mandatory be connected behind a POTS splitter containing a low pass filter for the POTS frequency band and a high pass filter for the DSL frequency band. One of the main in-house wiring problems is a missing POTS splitter. In such case, POTS phones, fax equipment, . . . and the xDSL modem or router are connected in parallel without a splitter at the right place. Some phones are transparent but a lot induce non-linear effects in the ADSL frequency band thereby reducing the performance of the ADSL connection.

Another frequently encountered problem is low quality in-house cabling. When the loop cable quality is bad, there is a lot of radio interference entering the copper pair: radio broadcasts are creating unwanted noise onto the copper pair in a narrow band fashion, which is called RFI or radio frequency interference in the DSL community. Usually, this is due to insufficient shielding and twisting of the in-house cable. Mostly in-house network suffer of this but sometimes, also the operator cable itself is of low quality, specially if aerial cabling is used like in the United States. Such RFI is affecting the ADSL performance because it reduces the available SNR (Signal Noise ratio. Hence, it reduces the amount of bits (or the data rate) that can be achieved with ADSL.

Another problem resulting from in-house wiring is impulsive noise. When using the ADSL modem for low speed Internet access, e.g. 500 kbit/s to 1 Mbit/s service, the noise margin of the modem is usually large. A large noise margin implies that very high noise peaks(ingress noise) can take place on the line without really disturbing the service. Also the TCP/IP protocol which is used to transmit Internet data over such ADSL connection, is able to repeat corrupted or lost IP packets. So, at the end the quality is always acceptable. When introducing high speed Internet access, the noise margin obviously will reduce and the transmission will be much more affected by ingress noise pulses. The problem can be such severe that so many IP packets are corrupted and need to be repeated that the user perception is a lower performance. Even worse: for video or high bandwidth real time services over Internet, the subscriber needs high data rates and there is no packet repetition possible. Any transmission error caused by impulse noise on the line now results in a lost IP packet. In case of video, this could result in a frozen image for a duration of around $\frac{1}{10}$ second. If this occurs too frequently, the subscriber will complain for the low quality of his video over DSL service. It is currently not possible to measure such impulse noise with the CP and CO modems synchronized at a low bit rate. The impulse noise often results from in-house wiring. Cables are twisted in some way, so there is more or less immunity to ingress noise. However, a large amount of common mode noise is captured on the line and fluctuating quite a lot over time. The in-house wiring is not perfectly well balanced and some common mode to differential mode conversion can take place. Thus, common mode noise coming into the CP modem is converted into differential noise. In the field, mainly in USA, a special type of common mode filter is used, like for instance the filter with reference L-222RJDP from the company Pulse/Excelsus. The goal is to filter out common mode signal captured along the loop before they enter the house. Impulse noise however can also be collected directly by the in-house wiring itself. This is mainly the case when the end-user places untwisted wires in-house.

Currently, detection of in-house wiring problems requires a human intervention for in-house wiring analysis. Dispatching a technician to the end-user's home to check if the in-house cabling complies with installation rules however is cumbersome and costly.

Moreover, "do-it yourself" type of xDSL installation has enabled low cost, massive deployment of xDSL connections, as a result of which telecom operator maintenance activities are unexpectedly exploding. Many xDSL end-users contact the customers care centres of these xDSL operators to complain about xDSL connection problems or low performing xDSL connections.

SUMMARY OF THE INVENTION

An object of the present invention is to provide a test method and test apparatus for detecting in-house wiring problems on large scale without having to dispatch a technician to the user's home, and without having to rely on cumbersome, manual and error-prone procedures.

According to the present invention, this object is realized by the method to test for in-house wiring problems defined in claim 1, and the apparatus for testing for in-house wiring problems defined in claim 11.

Indeed, by remotely (i.e. from the operator side) tuning or modifying upstream transmission parameters, like for instance the power mask (distribution of transmitted power over the upstream frequency band) or the carrier mask (in case of multi-carrier coding), it is possible to observe reactive results in downstream parameters in case of non-linear effects induced by the in-house wiring. The observation can be done at the CP side, e.g. by measuring certain parameters like the Signal Noise Ratio, or can be done at the CO side, e.g. by analyzing downstream parameter modifications that have been registered and reported to the CO by the CP. In case certain downstream parameter modifications are observed, the conclusion will be that there is an in-house cable wiring problem. More advanced embodiments of the invention will be able to discriminate between several categories of in-house wiring problems depending on the imposed upstream transmission profiles, and the observed reaction in the downstream channel.

Optionally, as defined by claim 2, the upstream transmission profile tuning may concern power and/or carrier mask tuning.

This way, by playing a sequence of upstream profiles with different upstream transmit PSD (Power Spectral Density) and/or different upstream carrier mask (in case of multi-carrier upstream line coding), observable variations in the downstream reception at the CP, like for instance variations in the Signal Noise Ratio, may be indicative for in-house wiring problems.

Also optionally, as defined by claim 3, the observed downstream parameter may be the SNR (Signal Noise Ratio).

Indeed, the upstream signal transmitted by the CP modem in accordance with the imposed profiles (e.g. imposed power and carrier masks) will for example enter the telephone set when a splitter is missing and create inter-modulation on semiconductors not intended to cope with the high frequencies of the DSL signal. The inter-modulation results in noise that disturbs the downstream signal reception at the CP modem, so the measured variation in SNR in the downstream channel, could lead to the conclusion of in-house wiring problems, like a missing splitter.

It is noted here that SNR variations can be observed by getting the SNR info directly from the CP modem. For instance, if the CP modem is an ADSL2 or ADSL2+ modem, it already measures the SNR for different purposes defined in the relevant standard specs (ITU-T G.992.3 and ITU-T G.992.5 Specifications), or it collects the SNR info for instance in a diagnostic mode. Alternatively, NM (Noise Margin) differences between profiles may be observed, or other parameters may be observed, from which SNR information may be deduced indirectly, for instance of the CP modem does not measure the SNR directly, which is the case for ADSL1 modems (compliant with ITU-T G.992.1 Specification).

A variant embodiment of the test method according to the present invention is defined in claim 4.

Indeed, by applying a first upstream PSD mask at nominal power level and a second upstream PSD mask at nominal power level −3 dB, and by observing a variation of SNR in the downstream channel, detection of a missing splitter is possible.

Another variant embodiment of the test method according to the present invention is defined in claim 5.

Indeed, when applying an upstream transmission profile wherein all odd upstream carriers are masked, the inter-modulation products can only be found on the even carriers. By observing an SNR difference between the odd and even downstream carriers, detection of a missing splitter is possible.

Yet another variant embodiment of the test method according to the present invention is defined in claim 6.

Indeed, when applying an upstream transmission profile wherein all upstream carriers whose index is not an integer multiple of 4 are masked, the inter-modulation products can only be found on carriers whose indexes are an integer multiple of 4. By observing an SNR difference between downstream carriers whose indexes are a multiple of 4, and other downstream carriers, detection of a missing splitter is possible.

Yet another variant embodiment of the test method according to the present invention is defined in claim 7.

Indeed, when applying an upstream transmission profile wherein about ¾ of the upstream carriers are masked, and for example only 8 upstream carriers around tone 16, are kept active, a missing splitter would result in SNR variations in downstream carrier ranges whose indexes center around multiples of 16.

Further variant embodiments of the test method according to the present invention are defined in claim 8 and claim 9.

Indeed, when applying a sequence of two upstream test transmission profiles, the first profile occupying the lowest part of the DSL frequency spectrum only and the second profile occupying the highest part of the DSL frequency spectrum, and by forcing the CP modem to fill all carriers with bits to obtain a very low target noise margin (e.g. 3 dB) and to put the modem in worse case condition for RFI noise, the downstream bitloading could be used as SNR image. This way, detection of bad quality in-house wiring becomes possible, because when the cable quality is bad, there is a lot of radio frequency interference (RFI) entering the copper pair. Usually, the low quality results from insufficient shielding and/or insufficient twisting of the cable. Usually, in-house network suffer from this but it is also possible that the operator's copper pairs themselves have this problem, especially if aerial cabling is used like in USA. The RFI is affecting the downstream DSL because it reduces the available SNR. Hence the RFI is reducing the amount of bits (data rate) that can be transmitted in the downstream channel, which is reflected in the downstream bitloading. Since SNR is not always available as such as a readable parameter for the operator, one could force the modem to fill all carriers with bits in order to make bitloading to be a direct image of the SNR.

Yet another variant embodiment of the test method according to the present invention is defined in claim 10.

Indeed, when applying a sequence of two upstream test transmission profiles, the first profile occupying the lowest part of the DSL frequency spectrum only and the second profile occupying the highest part of the DSL frequency spectrum, and by forcing the CP modem to obtain a very low target noise margin (e.g. 3 dB) and to put the modem in worse case condition for impulse noise, detection of unbalanced in-house cabling or missing common-mode filters by observing the evolution of error counters (FEC, CV, ES, SES and UAS) as a measure for the impulse noise (noise peaks on the line). The impulse noise present on the line can be characterized, e.g. its frequency, its level, short or long pulses, . . . , and with this information the operator can predict if the line is good enough to implement for example high speed Internet or video services. In addition, it enables the operator to issue recommendations for the configuration of error correction mechanisms in the CP modem, or to issue recommendations to install a common mode filter at the house of the end-user.

It is noted that the above variant embodiments of the test method according to the present invention, may be combined sequentially in enhanced variants of the test method according to the present invention that enable detection of and even discrimination between different categories of in-house wiring problems like missing splitters, low quality in-house cabling, unbalanced in-house cabling, untwisted in-house wiring, etc.

The invention is particularly useful in DSL access nodes such as ADSL DSLAMs or VDSL DSLAMs, and in network analysers for xDSL networks as is indicated by claims 12, 13 and 17, but could be applied with same advantages in DLC networks, optical networks, or ASICs used in any of those networks as indicated by claims 14, 15 and 16.

BRIEF DESCRIPTION OF THE DRAWINGS

The above mentioned and other objects and features of the invention will become more apparent and the invention itself will be best understood by referring to the following description of embodiments of the invention taken in conjunction with the accompanying drawing FIGURE which represents an ADSL network wherein an embodiment of the present invention is implemented.

DETAILED DESCRIPTION OF THE INVENTION

The drawing FIGURE depicts an Asymmetric Digital Subscriber Line (ADSL) network wherein a central office ADSL modem in the central office 1 (DSLAM or CO) connects to a customer premises ADSL modem 2 (MODEM or CP) via a twisted pair copper subscriber line 4. At the customer premises, a splitter 3 (SPLIT) is placed at the subscriber line termination, the splitter 3 having input/output ports connected respectively to the modem 3 and a telephone set 5 (POTS phone). In the subscriber's home, different PCs, 6 and 7, are connected to the modem 2 via a local area network 8 (LAN) such that the PCs can share the ADSL connection towards the central office. At the operator's side, a network analyzer 9 (NA), for instance a network diagnostic and analytic software tool running on a computer, is coupled to the central office 1.

To facilitate the work of technical staff of customer care services of the telecom operator that operates the ADSL network, a test tool for detecting in-house wiring problems such as a missing or malfunctioning splitter 3, insufficiently twisted or shielded in-house cabling, the need for a common mode filter, etc. is implemented in the network analyzer 9. This test tool is a software module that has access to the modem parameters (the MIB or Management Information Base) of the central office modem and customer premises modem, and which is able to remotely and automatically impose a sequence of upstream transmission profiles on the CP modem 2 with different upstream transmit PSD and/or different upstream carrier mask, while observing the SNR variation in the downstream channel. This software module this way aims at detecting three categories of in-house wiring problems: detection of missing splitter or inline filter, detection of low quality in-house cabling, and detection of unbalanced in-house cabling.

To detect missing splitters or inline filters, the test software imposes a first upstream transmission test profile on the CP modem 2 wherein all upstream carriers that have an odd index are masked, i.e. they are not transmitted. If the POTS phone 5 is connected to the twisted pair 4 without the central splitter 3 or without a distributed inline filter, the upstream signal that will be transmitted by the CP modem 2 in accordance with the imposed first transmission test profile will enter the POTS phone 5 and create inter-modulation on the semiconductors therein which are not intended to cope with the high frequencies of the transmitted ADSL signal. The inter-modulation results in noise that disturbs the downstream signal reception at the CP modem 2. Since all upstream odd carriers are masked, the inter-modulation products can be found only on even carriers. The test software therefore will observe the SNR of the odd carriers and the even carriers in the downstream channel. Thereto, the CP modem 2 which is supposed to be ADSL2 compliant and which has loop diagnostic capabilities, shares the SNR values measured on the downstream carriers with the test software. The test software analyzes these SNR values and will conclude that the central splitter 3 or an inline filter is missing when the SNR difference between the odd and even downstream carriers exceeds a certain threshold.

Secondly, to detect low quality in-house cabling, the test software imposes a second upstream transmission test profile on the CP modem 2 wherein only the lower half of the ADSL upstream frequency spectrum is used (upper half is masked) and a third upstream transmission test profile wherein only the upper half of the ADSL upstream frequency spectrum is used (lower half is masked). Both the second and third upstream transmission test profiles have a very low target noise margin (e.g. 3 dB) such as to put the CP modem 2 in worse case conditions for RFI noise. As a result of insufficient shielding or twisting of the in-house cabling, radio frequency interference (RFI) will enter the twisted copper pair 4. This RFI will affect the available SNR, and consequently also the data rate or amount of bits that can be conveyed in the downstream channel. Therefor, in parallel to imposing the second and third upstream transmission test profiles, the test software shall again analyze the SNR values measured on the downstream carriers, or alternatively force the modem to fill-in all downstream carriers with bits. The so obtained bitloading will be a direct image of the SNR. When the SNR or bitloading differs substantially between the second and third profile, the test software will conclude that the in-house cabling is of bad quality.

Thirdly, to detect unbalanced in-house cabling, the test software imposes a fourth upstream transmission test profile on the CP modem 2 wherein only the lower half of the ADSL upstream frequency spectrum is used (upper half is masked) and a fifth upstream transmission test profile wherein only the upper half of the ADSL upstream frequency spectrum is used (lower half is masked). Both the fourth and fifth upstream transmission test profiles have a very low target noise margin (e.g. 3 dB) such as to put the CP modem 2 in worse case conditions for impulse noise. As a result of unbalanced in-house wiring, common mode noise which is captured by the line 4 is converted into differential mode noise and enters the CP modem 2. This type of noise fluctuates a lot in time and consequently represents impulse noise that can lead to packet corruption, packet loss and service performance degradation, in particular for high bandwidth, real-time services like video where packet repetition is not possible. While imposing the fourth and fifth upstream transmission test profiles, the test software will observe and analyze parameters that are representative for the impulse noise level, like the evolution of bit error counters. The frequency, level and duration of the bit errors are used by the test software to predict if the in-house wiring is sufficiently balanced. If this is not the case, a recommendation can be issued to install common mode filters to filter out the common mode signal captured along the line 4 before it enters the in-house network.

Although an embodiment of the present invention has been described above based on 5 upstream test profiles, and specific downstream parameters like the SNR, bitloading and error counters to be observed and analyzed, the scope of the present invention is of course not restricted to any particular number of upstream transmission profiles, and particular sequence wherein such upstream transmission profiles are executed, and any particular downstream parameter observed while applying the upstream transmission profiles. These are choices that can be made by the test tool developer or the operator who is using the tool in his network. Possibly, the operator could even be given some design control for the upstream transmission profiles, and the observed parameters through plug-and-play software that comes with the test tool.

Thanks to the test software, human operator invention at the subscribers home is avoided. The operator can be recommended to check its in-house wiring or to insert splitters, inline filters or common mode filters at the right place. The in-house wiring is under the responsibility of the customer, so the diagnostic test tool according to the present invention allows to better separate the responsibilities of the operator and customer at low cost. Failures or service degradation can be detected proactively, which leads to increased service reliability and customer satisfaction. The test can be done automatically at initialization, or on purpose, e.g. when the subscriber contacts the operator's service center to complain about the service quality. The operator also can run the tests proactively at a regular pace, e.g. once a month.

As an alternative to residing in the network analyzer 9, the test software according to the present invention may be part of the CO modem software or DSLAM software. It can be part of the firmware associated with ASICs wherein the CO modem is integrated. Alternatively, its function may be implemented partially or integrally in hardware residing on the linecards in the central office 1, or on a separate test card in the central office 1, or even in a separate network element such as test hardware 10 to be connected to the central office 1.

Although reference was made above to ADSL (Asymmetric Digital Subscriber Line technology used for transmission over twisted pair telephone lines), any skilled person will appreciate that the present invention can be applied with same advantages in a cable based, a fiber based or a radio based access system, where variant access multiplexers aggregate the traffic from and to a substantial amount of access subscribers via optical cable or wireless links that may be affected by bad in-house cabling practice. Thus the access multiplexer could alternatively be a PON OLT (Passive Optical Network Line Termination), a mini-DSLAM or fiber-fed remote cabinet serving a smaller amount of ADSL or VDSL subscribers, a DLC (Digital Loop Carrier), etc.

Furthermore, it is remarked that an embodiment of the present invention is described above rather in functional terms. From the functional description, it will be obvious for a person skilled in the art of telecom hardware and/or software design, how to develop embodiments of the invention.

While the principles of the invention have been described above in connection with specific apparatus, it is to be clearly understood that this description is made only by way of example and not as a limitation on the scope of the claims.

The invention claimed is:

1. A method to test for in-house wiring problems in a network including a subscriber line concentrator, subscriber lines, subscriber modems, and in-house wiring, comprising:

automated and remote tuning, by a first network element, of upstream transmission test profiles; and measuring and analyzing by the first network element, at least one reaction of a second network element to the application of test profiles, the reaction indicative of whether in-house wiring problems exist.

2. A method according to claim 1, wherein said upstream transmission test profiles include power and/or carrier masks for the upstream channel.

3. A method according to claim 1, wherein said at least one reaction to the test profiles, by a second network element, includes Signal Noise Ratio (SNR) variations in the downstream channel.

4. A method according to claim 3, wherein said timing step applies a first power mask at nominal power level, and a second power mask at nominal power level −3 dB, while the measuring and analyzing step measures and analyzes Signal Noise Ratio (SNR) variations at the second network element.

5. A method according to claim 3, wherein said tuning step masks all upstream carriers with odd index numbers and the measuring and analyzing step measures and analyzes Signal Noise Ratio (SNR) differences between downstream carriers with odd and even indexes at the second network element.

6. A method according to claim 3, wherein said tuning step masks all upstream carriers with index numbers that are a multiple of 4, and the measuring and analyzing step measures and analyzes Signal Noise Ratio (SNR) differences between downstream carriers with index numbers that are a multiple of 4 and other downstream carriers, at the second network element.

7. A method according to claim 3, wherein said tuning step masks all upstream carriers with index numbers outside an interval of 16, and the measuring and analyzing step measures and analyzes Signal Noise Ratio (SNR) differences between downstream carriers with index numbers within intervals of multiples of 16 and other downstream carriers, at the second network element.

8. A method according to claim 3, wherein said tuning step force fills all upstream carriers with bits, and the measuring and analyzing step measures and analyzes bitloading, at the second network element, as a measure for the Signal Noise Ratio (SNR).

9. A method according to claim 3, wherein said tuning step includes a first transmission profile occupying the lowest part of the upstream frequency spectrum and a second transmission profile occupying the highest part of the upstream frequency spectrum, and the measuring and analyzing step measures and analyzes bitloading, at the second network element, as a measure for the Signal Noise Ratio (SNR).

10. A method according to claim 1, wherein said tuning step includes a first transmission test profile occupying the lowest part of the frequency spectrum and a second transmission test profile occupying the highest part of the frequency spectrum, and the measuring and analyzing step measures and analyzes an evolution of error counters.

11. A method accordIng to claim 1, wherein the first network element and the second network element are the same network element.

12. An apparatus for testing for in-house wiring problems in a network including a subscriber line concentrator, subscriber lines, subscriber modems, and in-house wiring, comprising:

a first network element configured to perform automated and remote tuning of upstream transmission test profiles, and the first network element further configured to measure and analyze at least one reaction to the test profiles, by a second network element, the reaction indicative of whether in-house wiring problems exist.

13. An apparatus according to claim 12, wherein said apparatus is integrated in said subscriber line concentrator.

14. An apparatus according to claim 13, wherein said subscriber line concentrator is a Digital Subscriber Line Access Multiplexer (DSLAM).

15. An apparatus according to claim 13, wherein said subscriber line concentrator is a Digital Loop Carrier (DLC).

16. An apparatus according to claim 13, wherein said subscriber line concentrator is an optical fibre aggregator.

17. An apparatus according to claim 12, wherein said apparatus is integrated in one or more application specific integrated circuits (ASIC).

18. An apparatus according to claim 12, wherein said apparatus is integrated in a network analyzer.

19. A physical computer readable medium storing a computer program for execution of the method in accordance with claim 1 on a computer system.

20. A central office product including a central processing unit and a storage medium configured to execute a routine for testing in-house wiring problems in a network including a subscriber line concentrator, subscriber lines, subscriber modems, and in-house wiring, comprising:

a first network element configured to perform automated and remote tuning of upstream transmission test profiles enable measuring and analyzing, by the first network element, at least one reaction of a second network element to the application of the test indicative of whether in-house wiring problems exist at said subscriber modems.

21. A subscriber modem product including a central processing unit and a storage medium configured to execute a routine for testing in-house wiring problems in a network including a subscriber line concentrator, subscriber lines, subscriber modems, and in-house wiring, comprising:

a first network element configured to perform automatic and remote tuning of upstream transmission test profiles, and the first network element further configured to measure and analyze at least one reaction of a second network element to the application of the test profiles indicative of whether in-house wiring problems exist.

* * * * *